May 26, 1931.   P. PAPPAS ET AL   1,807,132
BUMPER SYSTEM FOR TRUCKS AND AUTOMOBILES
Filed Sept. 27, 1930
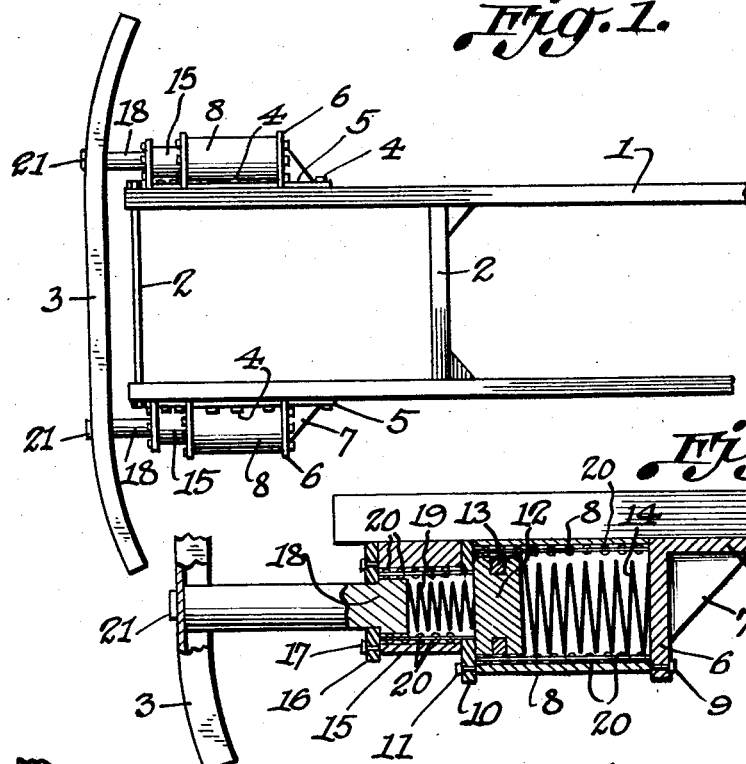
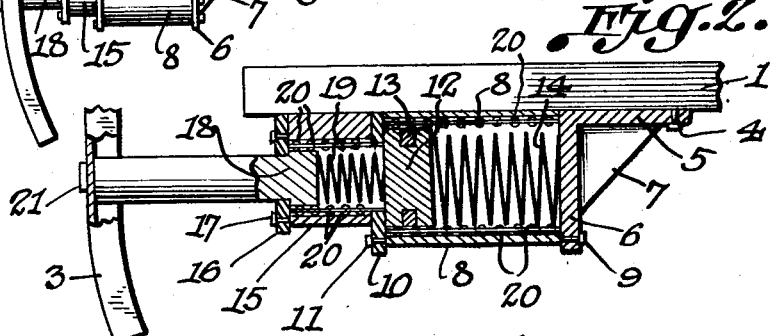
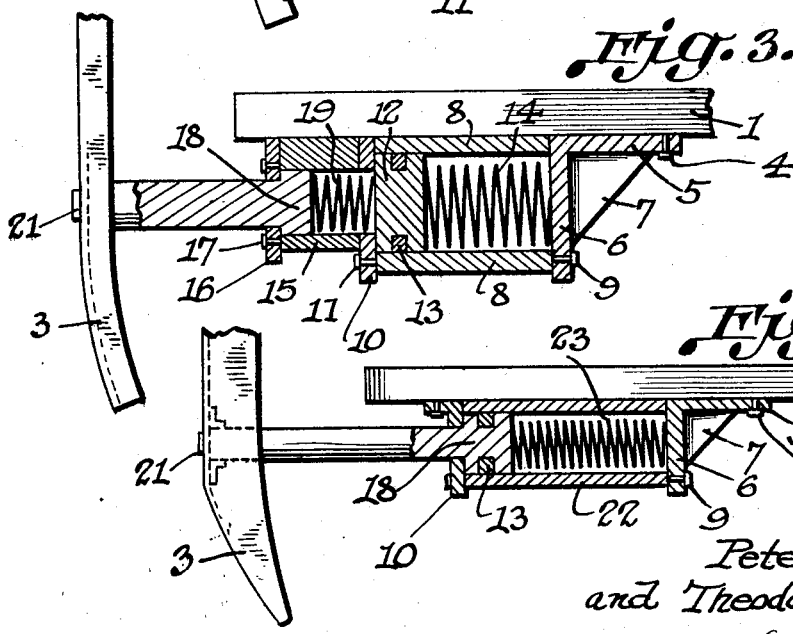
Inventors
Peter Pappas
and Theodore Patrou
By Lester L. Sargent
Attorney Patented May 26, 1931

1,807,132

UNITED STATES PATENT OFFICE

PETER PAPPAS AND THEODORE PATROU, OF WEBSTER CITY, IOWA

BUMPER SYSTEM FOR TRUCKS AND AUTOMOBILES

Application filed September 27, 1930. Serial No. 484,876.

The object of our invention is to provide a novel and efficient spring bumper adapted to take up the shocks of heavy vehicles such as trucks, and which in a modified form is also suitable for automobiles; and to provide the novel combination and arrangement of parts disclosed in the accompanying drawings and hereinafter described.

We attain these and other objects of our invention by the device illustrated in the accompanying drawings, in which,—

Figure 1 is a top plan view of our invention as applied to a truck;

Fig. 2 is a detailed horizontal sectional view through one of the spring bumper members;

Fig. 3 is a similar view of a modified form of the invention; and

Fig. 4 is a view of the modified invention as applied to automobiles.

Like numerals designate like parts in each of the several views.

Referring to the accompanying drawings, there is illustrated the conventional chassis 1 and cross members 2. We provide an L-shaped plate the side 6 of which forms the rear end of a main cylinder 8 while the side 5 of which is fastened to the chassis 1 by suitable means, such as bolt 4. We provide a main cylinder 8 suitably fastened as by bolt 9 to the end plate 6 and at the other end of a front plate 10 by bolt 11. We provide a spring 14 in main cylinder 8 and a piston 12 which normally is positioned at the forward end of the cylinder. We also provide a suitable piston ring 13 for the piston 12, as shown.

As shown in Figs. 2 and 3, we provide a secondary or smaller cylinder 15, having a spring 19, one end of which bears against the piston 12 and the main cylinder 8, and the other end of which bears against the smaller piston 18, which piston is extended through the apertured front plate 16 and has its forward end bolted at 21 to the bumper bar 3. Plate 16 is suitably secured to smaller cylinder 15, as shown, as by bolt 17. As shown in Fig. 2, we prefer to provide ball bearing cages 20 seated in the respective cylinders 8 and 15 and functioning to secure a smoother operation of the device.

In Fig. 3 there is illustrated a modified form of the invention as used in bumpers for trucks, in which the ball bearing cages are omitted.

Referring to Fig. 4, there is illustrated a modification of the invention for use on automobiles, in which a single cylinder 22 is employed, having a single but longer spiral spring 23 bearing against the piston 18 at one end and against the rear plate 6 at the other end.

We also prefer to provide ball bearing cages (not shown in Fig. 4 but similar to the ball bearing cages illustrated in Fig. 2 of the form of the invention as used for trucks).

The operation of the invention will be apparent from Figs. 2, 3 and 4;—the bumper bar 3 transmitting shocks to the pistons 18 which in turn press against the spring 19 (or in the form of the invention shown in Fig. 4, against the spring 23), spring 19 in turn exerting pressure on the piston 12, pressure of which in turn is resiliently taken up by the spring 14 as well as by the pneumatic pressure due to the movement of the respective pistons. By providing the ball bearing cages 20 a very smooth and efficient operation of the pistons is secured.

What we claim is:

1. In a bumper system, the combination of a bumper bar, pistons affixed to the bumper bar, cylinders in which said pistons are mounted, springs against which said pistons bear, a second and larger set of cylinders, pistons for said larger cylinders and against which the first mentioned springs bear, and a second and larger set of springs in said larger cylinders.

2. In a bumper system, the combination of a bumper bar, pistons affixed to the bumper bar, cylinders in which said pistons are mounted, springs against which said pistons bear, a second and larger set of cylinders, pistons for said larger cylinders and against which the first mentioned springs bear, a second and larger set of springs in said larger cylinders, and end plates forming the ends of the larger cylinders, said end plates being L-shaped and fastened to the chassis of the vehicle.

3. In a bumper system, the combination of a bumper bar, pistons affixed to the bumper bar, cylinders in which said pistons are mounted, springs against which said pistons bear, a second and larger set of cylinders, pistons for said larger cylinders and against which the first mentioned springs bear, a second and larger set of springs in said larger cylinders, and ball bearing cages mounted in each of the cylinders and within which the respective pistons are slidably mounted to cause a smoother operation of the pistons.

4. In a bumper apparatus, the combination of a bumper bar, pistons affixed to the bumper bar, cylinders in which said pistons are mounted, springs against which said pistons bear, ball bearing cages mounted in the cylinders, L-shaped plates functioning to form the rear wall of the cylinders and also functioning to provide a means for fastening the device to the automobile chassis.

5. In a bumper apparatus, the combination of a bumper bar, pistons operatively connected with the bumper bar, said pistons having piston rings, cylinders in which said pistons are mounted, springs against which said pistons bear, ball bearing cages mounted in the cylinders, L-shaped plates functioning to form the rear wall of the cylinders and also functioning to provide means for fastening the device to the automobile chassis.

6. In a bumper apparatus, the combination of a bumper bar, pistons operatively connected with the bumper bar, said pistons having piston rings, cylinders in which said pistons are mounted, springs against which said pistons bear, L-shaped plates functioning to form the rear wall of the cylinders and also functioning to provide a means for fastening the device to the automobile chassis.

PETER PAPPAS.
THEODORE PATROU.